United States Patent
Kataoka et al.

(10) Patent No.: US 7,795,766 B2
(45) Date of Patent: Sep. 14, 2010

(54) MOTOR

(75) Inventors: Nakaba Kataoka, Kyoto (JP); Takayuki Migita, Kyoto (JP); Hidehiro Haga, Kyoto (JP)

(73) Assignee: Nidec Corporation, Kyoto (JP)

( * ) Notice: Subject to any disclaimer, the term of this patent is extended or adjusted under 35 U.S.C. 154(b) by 315 days.

(21) Appl. No.: 12/039,822

(22) Filed: Feb. 29, 2008

(65) Prior Publication Data
US 2008/0211356 A1    Sep. 4, 2008

(30) Foreign Application Priority Data
Mar. 1, 2007    (JP)    ............... 2007-051336

(51) Int. Cl.
*H02K 11/00*    (2006.01)
*H02K 5/04*    (2006.01)
(52) U.S. Cl. ............... 310/68 B; 310/71; 310/68 E; 438/76.2
(58) Field of Classification Search ............... 310/68 B, 310/71, 68 E; 439/76.2; *H02K 11/00, 5/04*
See application file for complete search history.

(56) References Cited

U.S. PATENT DOCUMENTS

| | | | | |
|---|---|---|---|---|
| 6,125,528 A * | 10/2000 | Van Dine et al. | ............... | 29/596 |
| 6,462,454 B2 * | 10/2002 | Yamamoto et al. | ............... | 310/207 |
| 6,819,068 B2 * | 11/2004 | Horng et al. | ............... | 318/400.38 |
| 7,187,095 B2 | 3/2007 | Kokubu et al. | | |
| 7,589,443 B2 * | 9/2009 | Kataoka et al. | ............... | 310/68 B |
| 7,663,274 B2 * | 2/2010 | Kataoka et al. | ............... | 310/68 R |
| 2002/0175574 A1 * | 11/2002 | Okazaki et al. | ............... | 310/68 B |
| 2004/0189127 A1 * | 9/2004 | Kobayashi et al. | ............... | 310/144 |
| 2004/0232786 A1 | 11/2004 | Fukazawa et al. | | |
| 2005/0115352 A1 * | 6/2005 | Tanaka | ............... | 74/490.03 |
| 2005/0206254 A1 * | 9/2005 | Tsuge et al. | ............... | 310/68 B |
| 2005/0269895 A1 * | 12/2005 | Innami et al. | ............... | 310/218 |

(Continued)

FOREIGN PATENT DOCUMENTS

CN    1539190 A    10/2004

(Continued)

OTHER PUBLICATIONS

Kataoka et al.: "MOTOR," U.S. Appl. No. 12/039,819, filed Feb. 29, 2008.

(Continued)

*Primary Examiner*—Quyen Leung
*Assistant Examiner*—Terrance Kenerly
(74) *Attorney, Agent, or Firm*—Keating & Bennett, LLP

(57) ABSTRACT

A motor includes a housing having a substantially cylindrical shape accommodating therein a stator portion and a rotor portion. The housing includes a housing body having an opening at an upper side thereof, and a lid portion arranged between an armature and a sensor so as to close the opening of the housing body. Since the lid portion is made of a magnetic material and is arranged between the armature and the sensor, a magnetic effect on the sensor caused by a magnetic force generated at the armature is minimized. By virtue of such configuration in which the lid portion of the housing functions as a magnetic shield, the motor can be smaller in the axial direction compared with a configuration in which an extra layer of magnetic shield is arranged.

6 Claims, 10 Drawing Sheets

U.S. PATENT DOCUMENTS

| | | |
|---|---|---|
| 2006/0063403 A1* | 3/2006 | Kataoka et al. ............ 439/76.2 |
| 2006/0068617 A1* | 3/2006 | Migita et al. ............... 439/76.2 |
| 2006/0125334 A1 | 6/2006 | Kataoka et al. |
| 2006/0138883 A1 | 6/2006 | Yagai et al. |

FOREIGN PATENT DOCUMENTS

| | | | |
|---|---|---|---|
| JP | 2000-046513 A | 2/2000 |
| JP | 2004-157056 A | 6/2004 |
| JP | 3614380 B2 | 1/2005 |
| JP | 3663401 B2 | 6/2005 |

OTHER PUBLICATIONS

Kataoka et al.: "MOTOR," U.S. Appl. No. 12/039,825, filed Feb. 29, 2008.

* cited by examiner

MOTOR

FIELD OF THE INVENTION

The present invention relates to a motor.

DESCRIPTION OF THE RELATED ART

Conventionally, a hydraulic power steering apparatus is used in a vehicle such as a passenger car or the like to assist an operator in maneuvering the vehicle. The hydraulic power steering apparatus uses a pump operated by an engine of the vehicle to generate force to assist the operator's steering. In recent years, an electric power steering apparatus which uses a motor operated by a vehicle battery has become available. Such a system is more power efficient than the conventional hydraulic power steering apparatus.

Conventionally, the motor used to drive the electric power steering apparatus may include a magnetic sensor and a permanent magnet which is used to detect a rotary position of a rotor relative to a stator.

Also conventionally, the motor used to drive the electric power steering may include a substantially cylindrical shape having a cylindrical stator and a rotor arranged inside the stator. In such a motor, a plurality of terminals having an annular shape connecting the coils of the stator to an external power source are arranged above the rotor or the stator while retained by a holder thereof wherein a resolver which detects a rotary position of the rotor is arranged above the holder.

However, according to the conventional motor, since a magnetic shield for minimizing the magnetic effect applied to a magnetic sensor by the stator is arranged between the stator and the magnetic sensor, it is difficult to allow the dimensions of the motor to be reduced in the axial direction.

SUMMARY OF THE INVENTION

In order to overcome the problems described above, preferred embodiments of the present invention provide a motor including a stator portion having an armature, a rotor portion including a shaft concentric with a central axis, a rotor core having a substantially cylindrical shape arranged so as to surround the shaft, and a field magnet which is arranged at the rotor core and which, along with the armature, generates a torque centered about the central axis, a first bearing portion and a second bearing portion each arranged at a corresponding axial side of the rotor core to rotatably support the shaft, a sensor arranged at an axial side of the armature to magnetically detect an angular position of the rotor core with respect to the stator portion, and a housing arranged to accommodate therein the stator portion and the rotor portion. The housing includes a housing body having an opening at an axial side thereof, and a lid portion arranged between the armature and the sensor to retain the first bearing portion and the close the opening of the housing body.

By virtue of such configuration, the axial dimensions of the motor according to preferred embodiments of the present invention can be very small.

Other features, elements, steps, characteristics and advantages of the present invention will become more apparent from the following detailed description of preferred embodiments thereof with reference to the attached drawings.

DETAILED DESCRIPTION OF THE PREFERRED EMBODIMENTS

Figure 1:
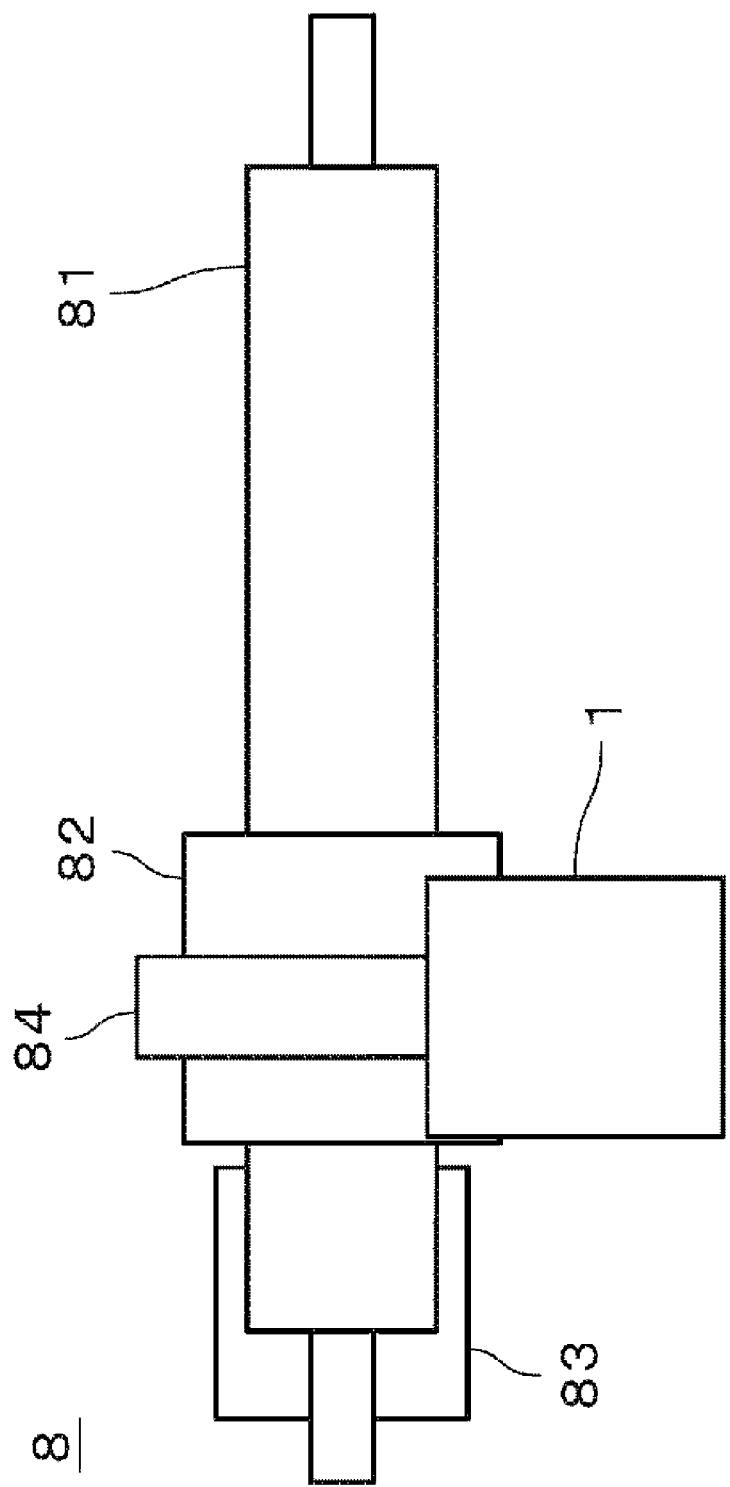
FIG. 1 is a schematic diagram of a power steering unit according to a first preferred embodiment of the present invention.

Note that in the description of preferred embodiments of the present invention herein, words such as upper, lower, left, right, upward, downward, top, and bottom for describing positional relationships between respective members and directions merely indicate positional and directions in the drawings. Such words do not indicate positional relationships and directions of the member mounted in an actual device. Also note that reference numerals, figure numbers, and supplementary descriptions are shown below for assisting the reader in finding corresponding components in the description of the preferred embodiments below to facilitate an understanding of the present invention. It is understood that these expressions in no way restrict the scope of the present invention.

FIG. 1 is a schematic diagram of a power steering unit 8 (e.g., EPS (Electric Power Steering apparatus)) having a motor 1 according to a first preferred embodiment of the present invention. The power steering unit 8 is preferably used to assist an operator (e.g., driver) in maneuvering a vehicle such as a passenger car.

As shown in FIG. 1, the power steering unit 8 preferably includes a shaft portion 81 which is connected to a steering wheel and/or a steering mechanism, a sensor 82 which detects a force applied to the steering wheel, a control unit 83 which, based on an output from the sensor 82, calculates an amount of force necessary to assist the operator, a motor 1 which, based on an output from the control unit 83, generates a necessary torque, and a deceleration mechanism 84 which supplies the torque to the steering mechanism.

In the vehicle having the power steering unit 8, the motor 1 of the power steering unit 8 is activated by the force which is applied to the steering wheel by the operator. Then the torque generated by the motor 1 assists the steering of the vehicle, thereby allowing the operator to steer the vehicle with a relatively small force without directly relying on an engine output of the vehicle.

Figure 2:
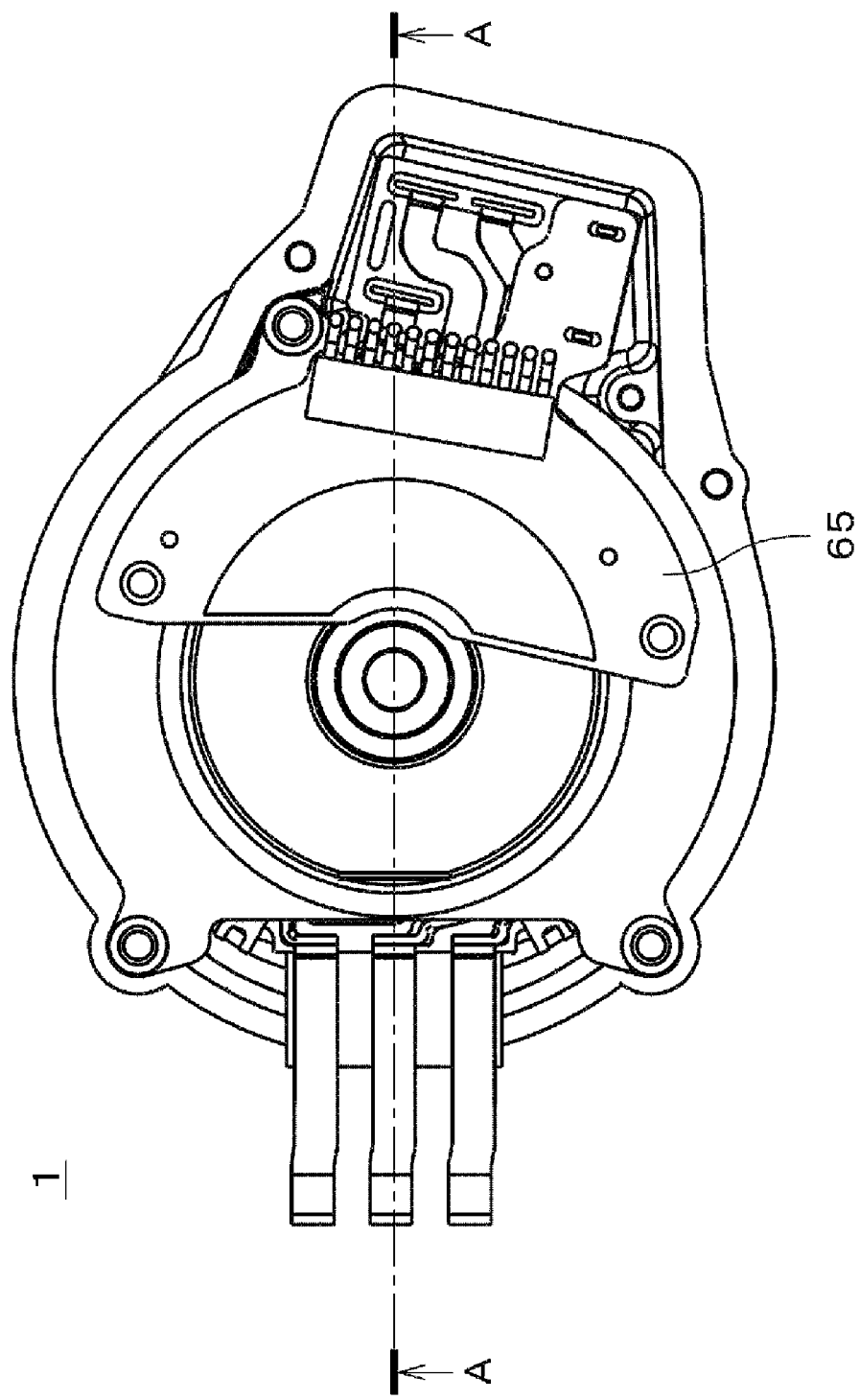
FIG. 2 is a schematic plan view of a motor according to the first preferred embodiment of the present invention.
Figure 3:
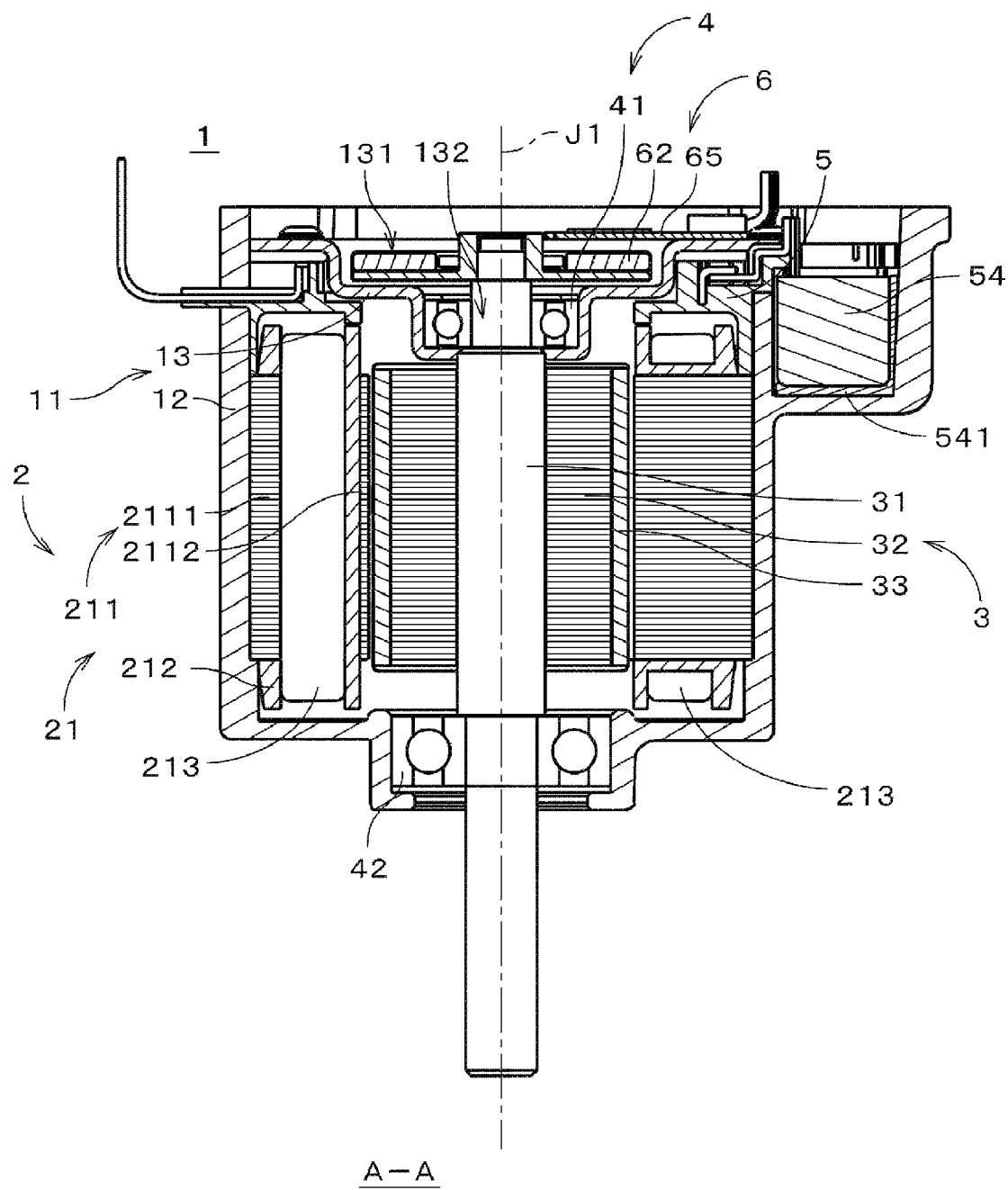
FIG. 3 is a schematic cross sectional view of the motor according to the first preferred embodiment of the present invention.

FIG. 2 is a schematic plan view of the motor 1. FIG. 3 is a schematic cross sectional view taken along a line A-A of the motor 1 shown in FIG. 2. Note that the motor 1 is a three phase motor activated by a three phase alternating current.

As shown in FIG. 3, the motor 1 which is an inner rotor type motor preferably includes a stator portion 2 which is a fixed assembly, a rotor portion 3 which is a rotatable assembly, a bearing mechanism 4 which rotatably supports the rotor portion 3 with respect to the stator portion 2 centered about the central axis J1, a busbar unit 5 which connects an armature 21 of the stator portion 2 to an external power source, and a sensor 6 which magnetically detects an angular position centered about the central axis J1 of a rotor core 32 (described below) of the rotor portion 3 with respect to the stator portion 2. Note that in the description herein, the busbar unit 5 and the sensor 6 are arranged axially above the armature 21.

The motor 1 also preferably includes a housing 11 which has a substantially cylindrical shape with a bottom and accommodates therein the stator portion 2, the rotor portion 3, the bearing mechanism 4 and the busbar unit 5. The housing 11 preferably includes a housing body 12 which preferably has an opening at an upper side thereof, and a lid portion 13 which is arranged between the armature 21 and the sensor 6 so as to close the opening of the housing body 12. The housing body 12 is preferably made of an aluminum alloy by die casting or the like (i.e., aluminum die cast). The lid portion 13 is preferably made by pressing a magnetic steel plate. The lid portion 13 preferably includes a first concave portion 131 which is arranged such that the concave shape thereof extends downwardly from the lid portion 13, and a second concave portion 132 which is arranged radially inward of the first concave portion 131 and is arranged such that the concave shape thereof extends downwardly.

The stator portion 2 preferably includes the armature 21 which is arranged at an inner circumferential surface of the housing body 12 by a deformation process such as heat shrinking or caulking or the like. The armature 21 preferably includes a stator core 211 which is formed by laminating a plurality of thin silicon steel plates. The stator core 211 preferably includes a core back 2111 having an annular shape, and a plurality (for example, 9 in the present preferred embodiment) of teeth 2112 each extending from the core back 2111 toward the central axis J1. Note that the stator core 211 preferably includes a plurality of multi segment cores each including a tooth 2112 (for example, 9 segments in the present preferred embodiment). According to the stator core 211 of the present preferred embodiment, an outer circumferential portion of the core back 2111 preferably includes a concave portion which engages with a protrusion arranged at an inner circumferential surface of the housing body 12 in order to minimize a circumferential movement of the stator core 211. The concave portion is also used as a position determiner for a first Hall element 641 and a second Hall element 642 (see FIG. 7) with respect to a sensor magnet 62 (described below) when the first Hall element 641 and the second Hall element 642 are attached to the circuit board 65 when the lid portion 13 of the housing 11 is attached to the housing body 12.

The armature 21 preferably includes an insulator 212 which is made of an insulating material covering a surface of the teeth 2112, and a plurality (for example, 9 in the present preferred embodiment) of coils 213 which are formed by winding a wire in a concentrated manner around corresponding teeth 2112 via the insulator 212.

In the motor 1, three coils 213 corresponding to a U-phase of a drive current, three coils 213 corresponding to a V-phase of the drive current, three coils 213 corresponding to a W-phase of the drive current are connected to corresponding electrodes of the external power source. In the present preferred embodiment, the three coils 213 corresponding to the U-phase are connected in a parallel manner to the U-phase electrode of the external power source (remaining coils 213 are connected in the same manner).

The rotor portion 3 preferably includes a shaft 31 centered about the central axis J1, the rotor core 32 which is arranged around the shaft 31, and a field magnet 33 which is arranged via an adhesive at an outer circumferential surface of the rotor core 32. The rotor core 32 is preferably formed by laminating a plurality of thin silicon steel plates. In the motor 1, the field magnet 33 is arranged radially inward of the armature 21 centered about the central axis J1. The torque centered about the central axis J1 is generated between the armature 21 and the field magnet 33.

The bearing mechanism 4 preferably includes a first bearing portion 41 which is accommodated in the second concave portion 132 of the lid portion 13, and a second bearing portion 42 which is arranged at a substantially central portion of a bottom of the housing body 12 and which is arranged such that a concave portion thereof extends downwardly. According to the present preferred embodiment, the first bearing portion 41 and the second bearing portion 42 are preferably ball bearings. A portion of the shaft 31 preferably protrudes upwardly from the lid portion 13 via a central opening of the second concave portion 132. Also, the shaft 31 is rotatably supported by the first bearing portion 41 and the second bearing portion 42.

Figure 4:
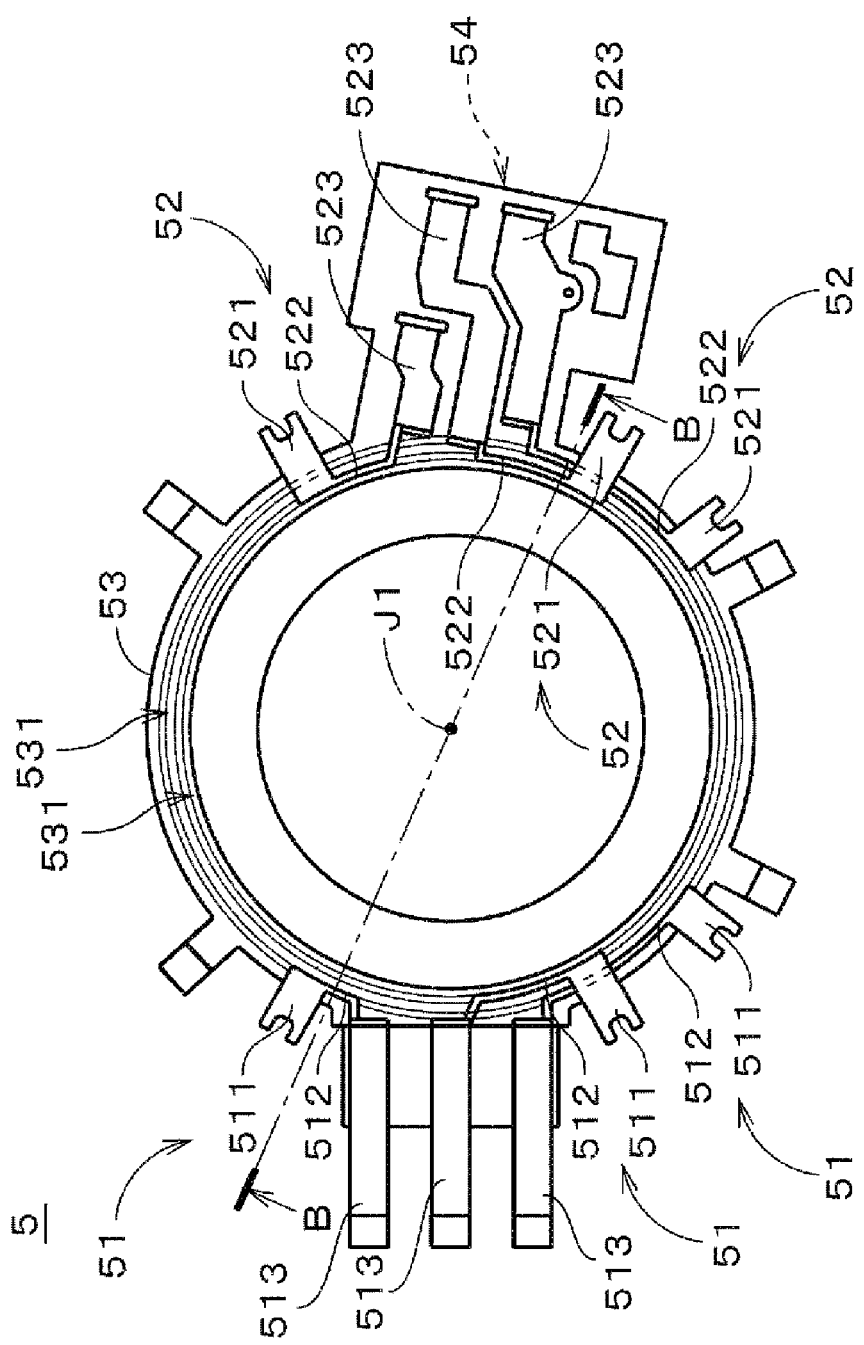
FIG. 4 is a schematic plan view of a busbar unit according to the first preferred embodiment of the present invention.
Figure 5:
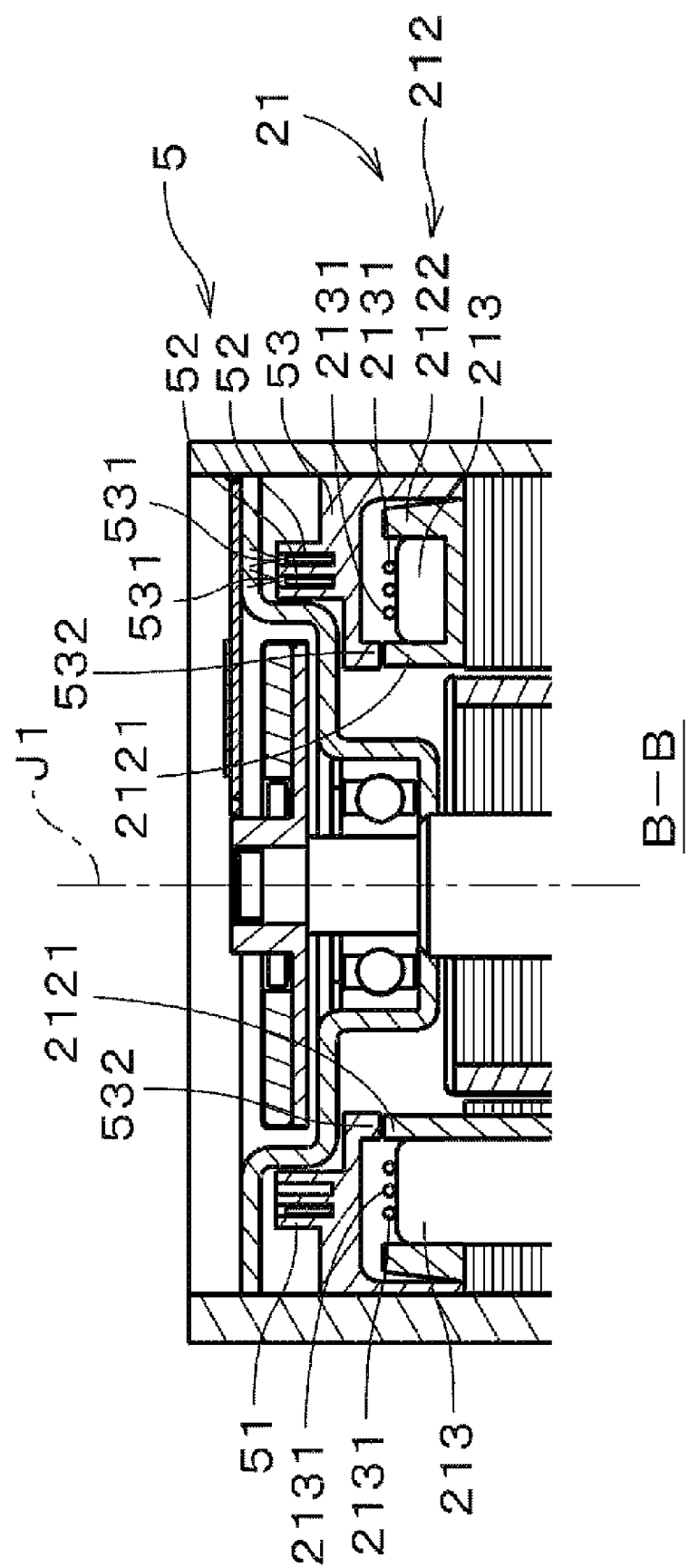
FIG. 5 is a schematic cross sectional view of the busbar unit according to the first preferred embodiment of the present invention.

FIG. 4 is a schematic plan view of the busbar unit 5. FIG. 5 is a schematic cross sectional view taken along a line B-B of the busbar unit 5 shown in FIG. 4. As shown in FIGS. 4 and 5, the busbar unit 5 preferably includes a plurality of first busbars 51 and a plurality of second busbars 52 which are made of a conductive material, and a busbar holder 53 which is made of an insulating material. The busbar holder 53 preferably retains the first busbar 51 and the second busbar 52 in a non-contact manner between the first busbar 51 and the second busbar 52. As shown in FIG. 4, a number of the first busbars 51 and a number of the second busbars 52 each equal a number (for example, 3 in the present preferred embodiment) of phases of the drive current conducted to the armature 21 from the external power source.

The busbar unit 5 preferably includes, as shown in FIGS. 3 and 4, a relay 54 which is operable to control the drive current conducted to the armature 21 from the external power source. To be more specific, when the coil 213 is damaged (e.g., occurrence of a short circuit, etc.), the relay 54 preferably blocks the connection between the external power source and the armature 21 in order to minimize an electromagnetic lock or the like. As shown in FIG. 3, the housing body 12 having a substantially cylindrical shape preferably includes a protruding portion arranged near the opening which protrudes radially outwardly and accommodates therein the relay 54. The relay 54 is arranged at an inner circumferential surface of the housing body 12 via an adhesive layer 541.

In the power steering unit 8, the external power source is electrically connected to the armature 21 to which the drive current is conducted from the external power source. When the electromagnetic lock in which the rotor core 32 is locked due to a magnetic force of the armature 21 occurs when an abnormality (e.g., malfunction of switch for the drive current, or the like) of control signal controlling the drive current is sensed, the relay 54 disconnects a neutral point of the armature 21 in order to release the electromagnetic lock. By virtue of such configuration, the steering mechanism of the vehicle will not be locked, and therefore, the operator is allowed to operate the vehicle safely.

As shown in FIGS. 4 and 5, the busbar holder 53 preferably includes a substantially annular shape centered about the central axis J1. Also, the busbar holder 53 preferably includes a pair of groove portions 531 which are concentric with one another at an axially upper portion thereof. The first busbars 51 and the second busbars 52 each having a substantially arc shape centered about the central axis J1 preferably include a surface which preferably extends in the axial direction. To be more specific, each busbar (51 and 52) includes a substantially cylindrical shape extending along the central axis J1.

As shown in FIG. 4, the three second busbars 52 of the busbar unit 5 are arranged near the relay 54, and the three first busbars 51 are arranged at an opposite end from the relay 54 across the central axis J1. The three first busbars 51 and the three second busbars 52 are arranged so as to be spaced evenly apart from one another in the circumferential direction.

The first busbars 51 each preferably include a first terminal 511 which is connected to an end portion of the wire forming the coils 213 (see FIG. 3), a first busbar body 512 having a substantially arc shape at which the first terminal 511 is arranged, and a connecting portion 513 which extends radially outwardly from the first busbar body 512 so as to be connected to the external power source. Also, the second busbars 52 each preferably include a second terminal 521 which is connected to an end portion of the wire forming the coils 213, a second busbar body 522 having a substantially arc shape at which the second terminal 521 is arranged, and a relay connecting portion 523 which extends radially outwardly from the second busbar body 522 so as to be connected to the relay 54.

According to the busbar unit 5 of the present preferred embodiment, the connecting portions 513 of the three first busbars 51 are preferably arranged close to one another. The first busbar body 512 of one of the first busbars 51 preferably extends, in a clockwise direction from the connecting portion 513, at the groove portion 531 which is arranged furthest from the central axis J1. As for other two first busbar bodies 512, one of the two preferably extends at the groove portion 531 arranged at an outer side of the busbar holder 53, and the other of the two preferably extends at the groove portion 531 arranged at an inner side of the busbar holder 53 both extending in a counter clockwise direction from the connecting portion 513. The two first busbar bodies 512 include portions overlapping each other in the radial direction.

Also, the relay connecting portions 523 are arranged near one another. One of the second busbar bodies 522 arranged at the groove portion 531 which is arranged at an inner side of the busbar holder 53 and extends from the relay connecting portion 523 in a counter clockwise direction. Another second busbar body 522 arranged at the groove portion 531 of an outer side of the busbar holder 53 preferably extends in the clockwise direction with respect to the relay connecting portion 523, while the third busbar body 522 arranged at the groove portion 531 of an inner side of the busbar holder 53 preferably extends in the clockwise direction with respect to the relay connecting portion 523. Note that the aforementioned two second busbar bodies 522 are arranged so as to be overlap each other in the radial direction.

As described above, according to the busbar unit 5 of the present preferred embodiment of the present invention, the three first busbars 51 are arranged so as not to overlap each other in the radial direction. Also, the three second busbars 52 are arranged so as not to overlap each other in the radial direction. That is, since the first busbars 51 (and the second busbars 52) are not entirely overlapping in the radial direction, a space between the central axis J1 and the first busbar 51 (and the second busbars 52) arranged nearest to the central axis J1 is enlarged compared with a configuration in which three busbars overlap in the radial direction.

According to the motor 1 of the present preferred embodiment, the three wires forming the coils 213 corresponding to each phase of the drive current (for example, 9 wires in the present preferred embodiment) each include an end portion connected to the first terminal 511 of the corresponding first busbar 51, and the other end portion of the wires are connected to the second terminal 521 of the corresponding second busbar 52 and to the relay 54 via the second busbar 52.

Figure 6:
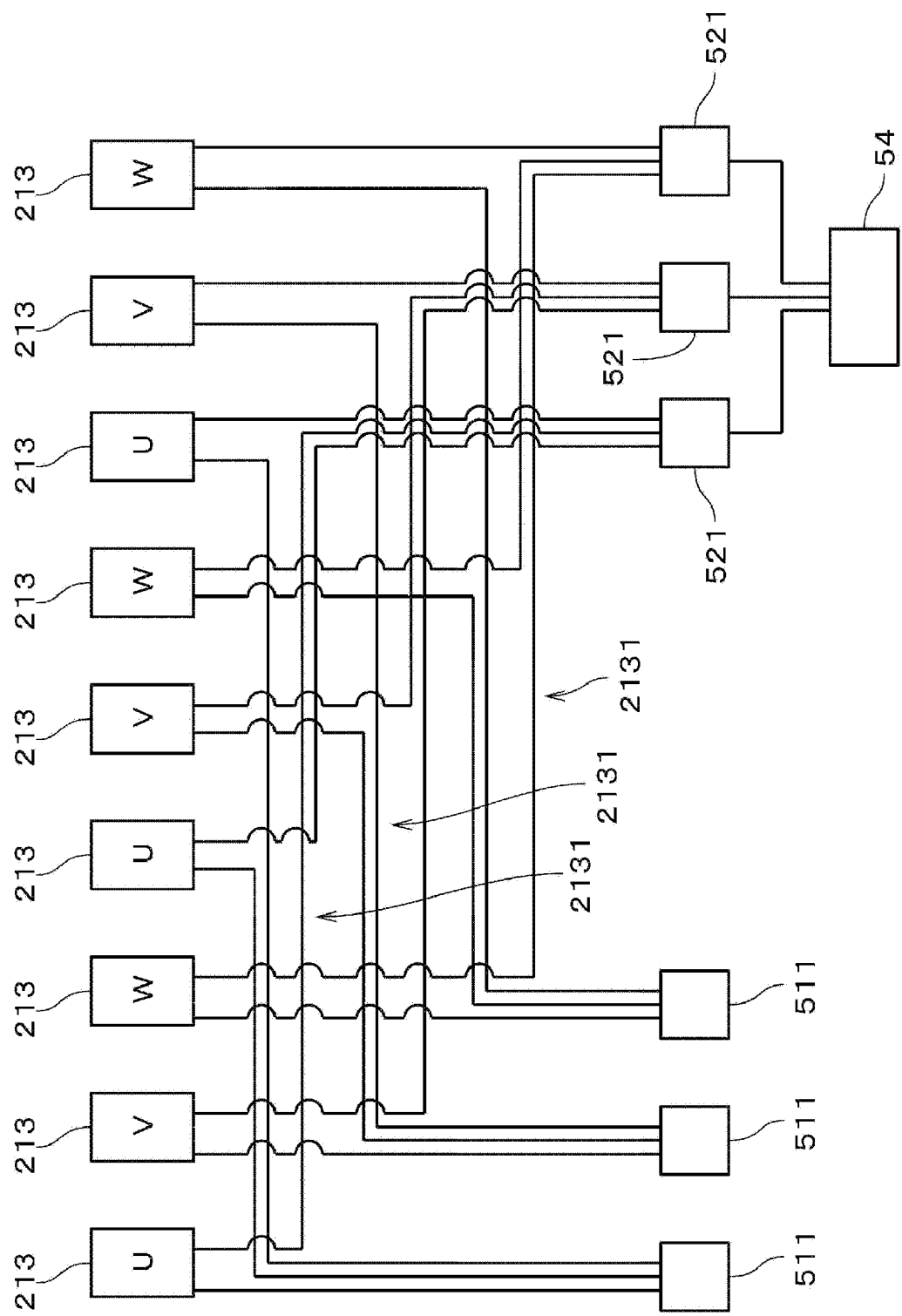
FIG. 6 is a schematic diagram of connection between coils, connecting wire portions and terminals according to the first preferred embodiment of the present invention.

FIG. 6 is a schematic diagram of a plurality of connecting wire portions 2131 of the wires connecting the 9 coils 213 of the armature 21 to the three first terminals 511 and to the three second terminals 521 of the busbar unit 5. Note that letters (U, V, and W) denoted in FIG. 6 indicate the corresponding phases of the drive current. As can be seen in FIG. 6, according to the motor 1 of the present preferred embodiment, three coils 213 corresponding to the three phases of the drive current are arranged in a parallel manner. The connecting wire portions 2131 are, as shown in FIG. 5, arranged at a space between the coils 213 and the busbar unit 5.

Also, the motor 1 according to the present preferred embodiment preferably includes at a radially inner side of the coils 213 an inner side protruding portion which preferably includes a plurality of first inner side protruding portions 2121 arranged at the insulator 212 and a second inner side protruding portions 532 arranged at the busbar holder 53. The first inner side protruding portions 2121 each preferably having a substantially annular shape are preferably arranged at a radially inner side of the coils 213 in a protruding manner toward the busbar unit 5. Also, the second inner side protruding portion 532 having a substantially annular shape is preferably arranged at the radially inner side of the coils 213 in the protruding manner toward the first inner side protruding portions 2121. Also, a radially inner side of the connecting wire portions 2131 is covered by the inner side protruding portion.

According to the motor 1 of the present preferred embodiment, an axial distance between the first inner side protruding portions 2121 and the second inner side protruding portion 532 is preferably smaller than a diameter of a connecting wire portion 2131. Also, an axially top end of the first inner side protruding portion 2121 is preferably nearer than the coils 213 to the busbar holder 53.

According to the armature 21 of the present preferred embodiment, the insulator 212 preferably includes a plurality of outer side protruding portions 2122 having a substantially annular shape at a radially outer side of the coils 213. The outer side protruding portions 2122 preferably protrude toward the busbar holder 53. Also, an axially top end of the outer side protruding portion 2122 is preferably nearer than the coils 213 to the busbar holder 53.

Figure 7:
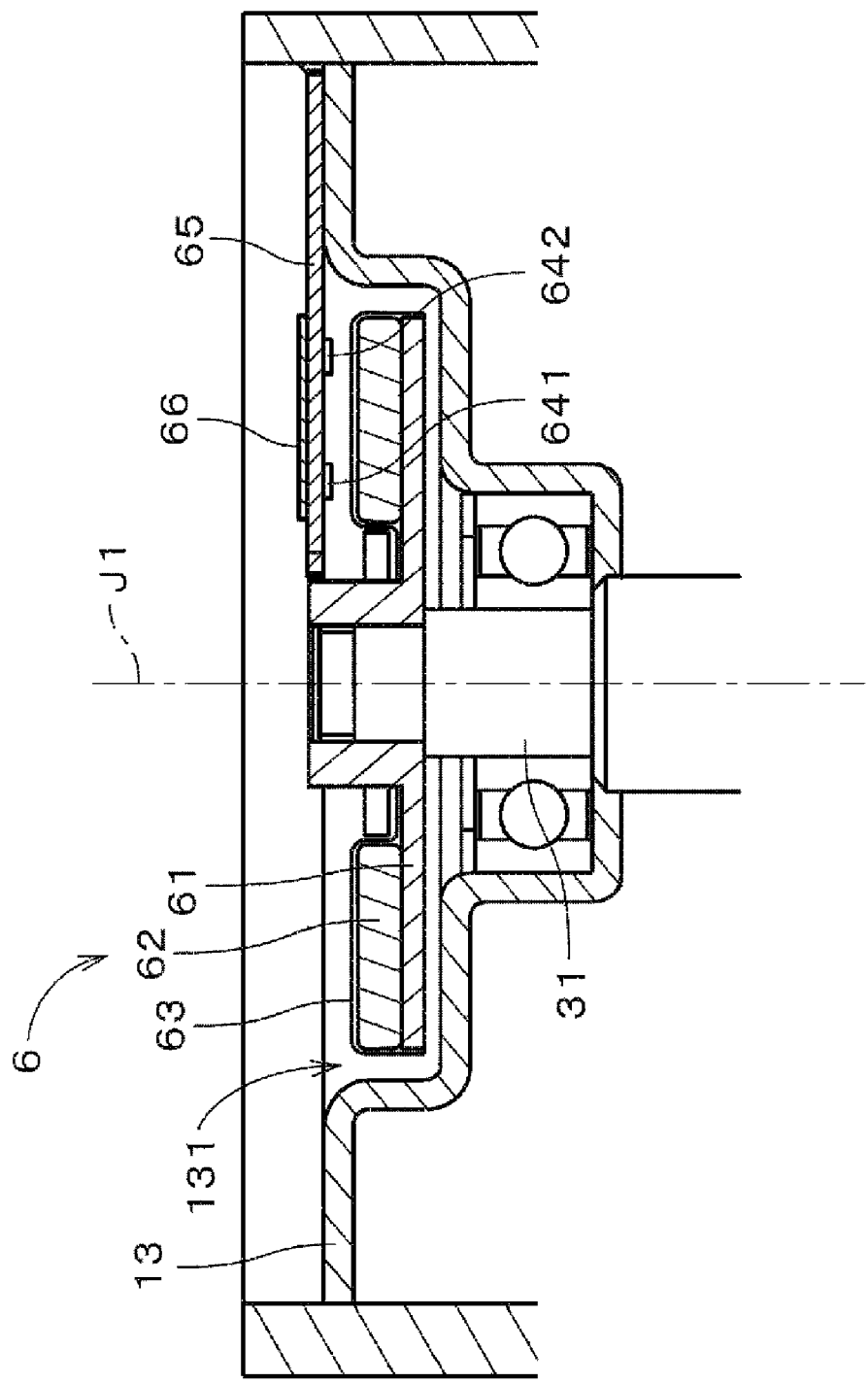
FIG. 7 is a schematic enlarged cross sectional view of an area surrounding a sensor according to the first preferred embodiment of the present invention.

FIG. 7 is a schematic enlarged cross sectional view of an area surrounding the sensor 6. As shown in FIG. 7, the sensor 6 preferably includes a yoke 61 affixed to the shaft 31, the sensor magnet 62 affixed at the yoke 61 and affixed indirectly to the shaft 31, and a magnet cover 63 which covers a surface of the sensor magnet 62 other than a portion in contact with the yoke 61. To be more specific, the yoke 61 preferably having a substantially annular shape arranged perpendicularly to the central axis J1 is made of a magnetic material. The sensor magnet 62 preferably has a substantially annular shape and is arranged perpendicularly to the central axis J1. The magnet cover 63 which is preferably made of a nonmagnetic material is affixed to the yoke 61. The magnet cover 63 is preferably made of a metal material (aluminum, in the present preferred embodiment). Note that the magnet cover 63 may be made of a nonmagnetic stainless material. Also note that the yoke 61, the sensor magnet 62, and the magnet cover 63 are accommodated in the first concave portion 131 of the lid portion 13.

Figure 8:
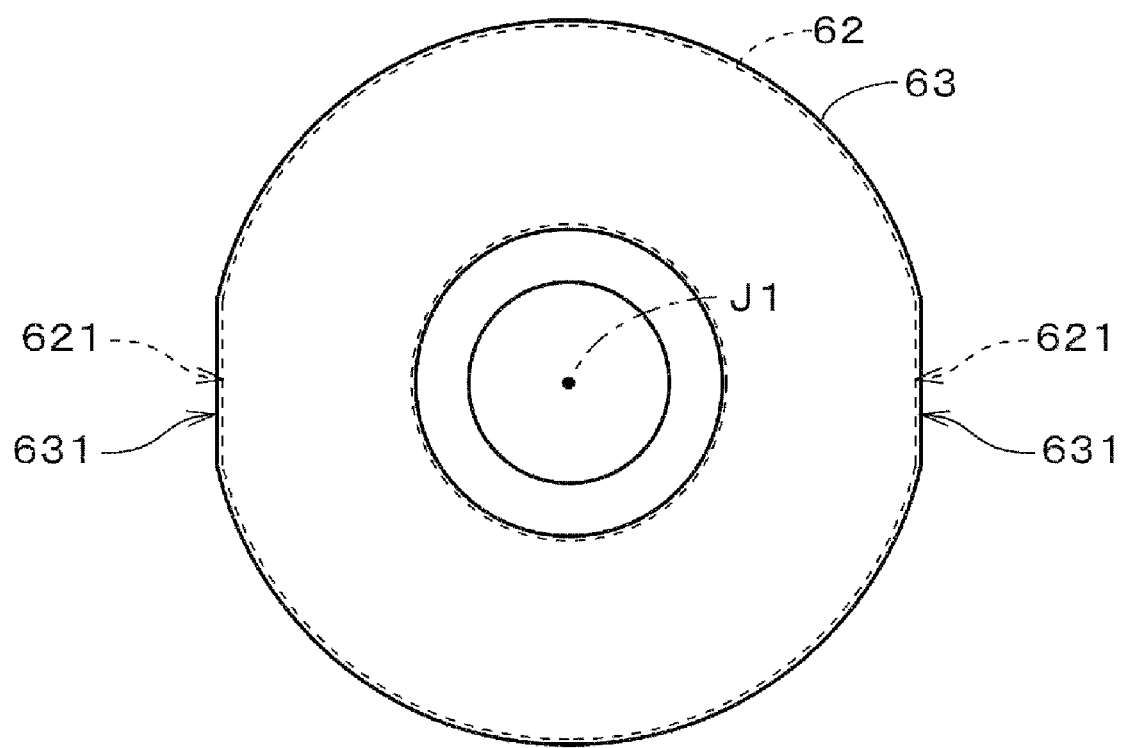
FIG. 8 is schematic plan view of a magnet cover and a sensor magnet according to the first preferred embodiment of the present invention.

FIG. 8 is a schematic plan view of the magnet cover 63 and the sensor magnet 62. As shown in FIG. 8, the sensor magnet 62 preferably includes at least one (for example, 2 in the present preferred embodiment) notched portion 621 at which an outer circumferential line of the sensor magnet 62 includes a straight line when viewed from above. Also, the magnet cover 63 preferably includes at least one (for example, 2 in the present preferred embodiment) flat surface portion 631 at an area corresponding to the notched portion 621. According to the sensor 6 of the present preferred embodiment, the notched portion 621 and the flat surface portion 631 make up a pair of engagement portions each restricting a circumferential movement of one another.

As shown in FIG. 7, the sensor 6 preferably includes the first Hall element 641, the second Hall element 642, the circuit board 65, and a back yoke 66. The first Hall element 641 and the second Hall element 642 are preferably arranged at an upper surface of the sensor magnet 62 whereas the yoke 61 is preferably arranged at a lower surface. The circuit board 65 is preferably arranged above the first Hall element 641 and the second Hall element 642. To be more specific, the first Hall element 641 and the second Hall element 642 are preferably affixed at a bottom surface of the circuit board 65 axially opposite to the sensor magnet 62. The back yoke 66 preferably is a plate member made of a magnetic material affixed at a top surface of the circuit board 65 via an insulating member. Note that the circuit board 65 is arranged axially above the first Hall element 641 and the second Hall element 642. An axial thickness of the back yoke 66 is preferably greater than approximately 0.5 mm, for example.

The circuit board 65 preferably includes, as shown in FIG. 2, a substantially semicircular shape. Also, the circuit board 65, as shown in FIG. 7, is preferably affixed at a top surface of the lid portion 13 while covering preferably portion of the first concave portion 131.

The sensor 6 preferably includes, as described above, three first Hall elements 641, for example, which are arranged so as to be spaced evenly apart from one another circumferentially centered about the central axis J1. Also, the sensor 6 preferably includes two second Hall elements 642, for example, which are arranged radially outward of the first Hall element 641 in the circumferential direction (that is, a distance between the first Hall elements 641 and the central axis J1 is different from a distance between the second Hall element 642 and the central axis J1). According to the present preferred embodiment, each second Hall element 642 preferably includes two Hall elements and is a magnetic encoder.

Figure 9:
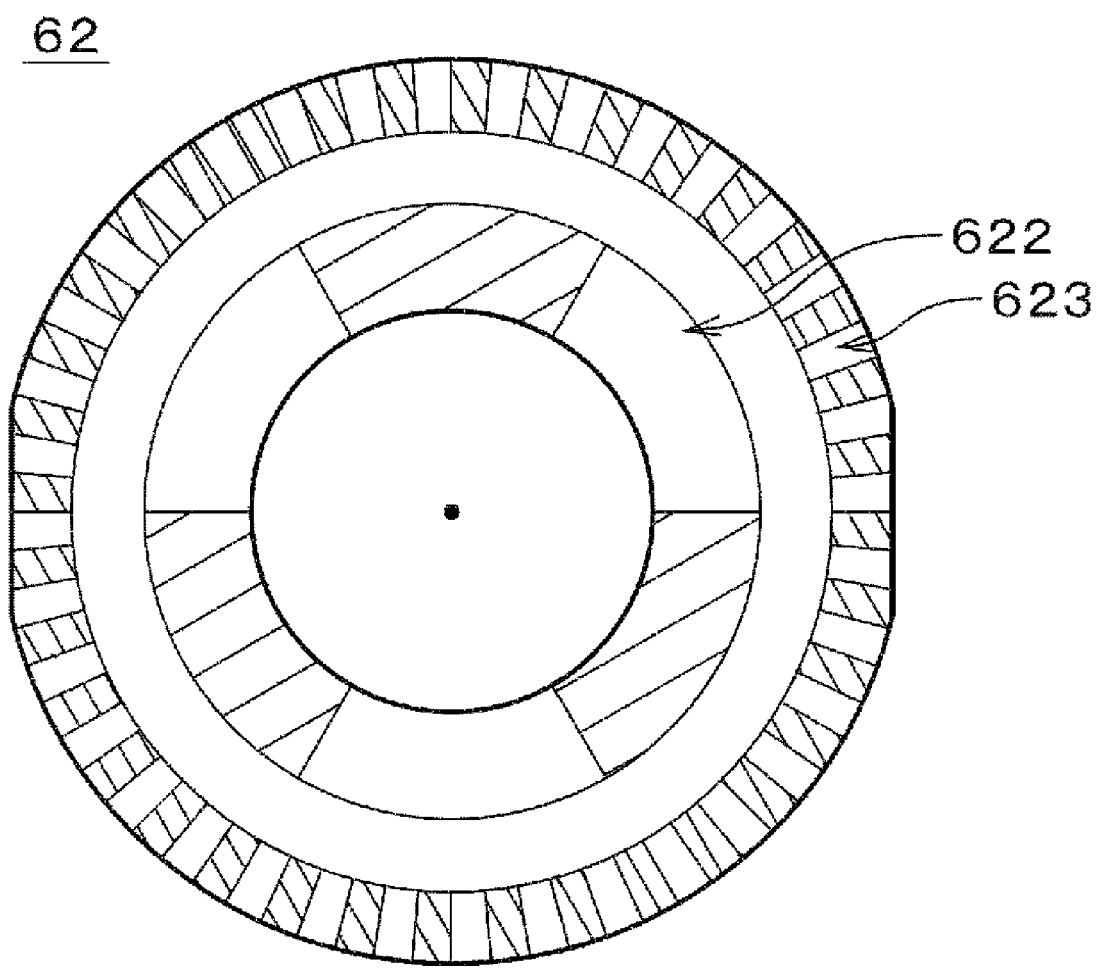
FIG. 9 is a schematic plan view of magnetic poles of the sensor magnet according to the first preferred embodiment of the present invention.

FIG. 9 is a schematic plan view of a magnet pole when viewed from an upper surface of the sensor magnet 62 (i.e., magnetized surface). Note that for clarity of depiction, diagonal lines are indicated to denote a north magnetic pole. As shown in FIG. 9, the sensor magnet 62 preferably includes a first domain 622 preferably having a substantially annular shape which is arranged opposite to the first Hall element 641 (see FIG. 7) when the sensor magnet 62 rotates, and a second domain 623 preferably having an annular shape which is arranged opposite to the second Hall element 642 (see FIG. 7). Note that a number of the magnetic poles of the first domain 622 is different from a number of the magnetic poles of the second domain 623. According to the present preferred embodiment, the number of the magnetic poles of the first domain 622 and that of the second domain 623 are preferably six and seventy-two, respectively, for example.

According to the motor 1 of the present preferred embodiment, when the rotor core 32 of the rotor portion 3 shown in FIG. 3 rotates, the sensor magnet 62 of the sensor 6 shown in FIG. 7 rotates along with the shaft 31 and the rotor core 32. When the sensor magnet 62 rotates, the first Hall element 641 and the second Hall element 642 sense the magnetic poles of the first domain 622 and the second domain 623. Then, based on an output from the first Hall element 641 and the second Hall element 642, an angular position centered about the central axis J1 of the rotor core 32 will be detected with respect to the armature 21.

As described above, according to the motor 1 of the present preferred embodiment, the lid portion 13 is arranged between the armature 21 and the sensor 6, and is made of a magnetic material. By virtue of such configuration, a magnetic effect on the sensor 6 caused by a magnetic force generated by the armature 21 is minimized. That is, according to the present preferred embodiment of the present invention, the lid portion 13 of the hosing 11 acts as a magnetic shield for the sensor 6. Consequently, the motor 1 can have a significantly reduced dimension in the axial direction compared with a configuration in which a separate magnetic shield is arranged therein.

The motor used for assisting the operator in maneuvering the vehicle is expected to be small in dimensions in order to improve vehicle interior space and for environmental concerns (e.g., fuel efficiency and reduction of carbon dioxide, etc.). Thus, the motor 1 as described above is particularly suitable for the motor used to assist maneuvering the vehicle or the like.

Note that since the lid portion 13 is preferably formed by pressing, the lid portion 13 is allowed to be thin while retaining the durability required. By virtue of such configuration, the motor 1 having such lid portion 13 is allowed to be small in the axial direction. Also, the lid portion 13 can be manufactured easily.

According to the motor 1 of the present preferred embodiment, the first concave portion 131 and the second concave portion 132 of the lid portion 13 are arranged at the inner side (near the central axis J1) of the busbar holder 53. Also, the first bearing portion 41 and the sensor magnet 62 of the sensor 6 are correspondingly accommodated at the second concave portion 132 and the first concave portion 131. By virtue of such configuration, the motor 1 is allowed to be smaller than a configuration in which the first bearing portion 41 and the sensor 6 are arranged above or below the busbar holder 53.

According to the sensor 6 of the present preferred embodiment, since the first Hall element 641 is arranged axially correspondingly to the sensor magnet 62 which is arranged perpendicularly to the central axis J1, an axial dimension of the sensor 6 is allowed to be small, and therefore, the motor 1 is allowed to be small in the axial direction.

Also according to the sensor 6 of the present preferred embodiment, the second Hall element 642 is arranged radially outwardly of the first Hall element 641, and the number of magnetic poles of the first domain 622 corresponding to the first Hall element 641 is different from the number of magnetic poles of the second domain 623 corresponding to the second Hall element 642. Also according to the sensor 6 of the present preferred embodiment, since the angular position of the rotor core 32 centered about the central axis J1 is detected based on the output from the first Hall element 641 and that from the second Hall element 642, the accuracy of the detection is improved compared with a configuration in which the angular position is detected from either an output from the first Hall element or that from the second Hall element.

According to the motor 1 of the present preferred embodiment, since the radial dimensions of the busbar holder 53 are improved, the sensor magnet 62 is easily arranged at the inner side of the busbar holder 53. By virtue of such configuration, the sensor magnet 62 having a wide radial dimension corresponding to the first Hall element 641 and the second Hall element 642 each having a different distance from the central axis J1 is easily arranged at the inner side of the busbar holder 53.

While the preferred embodiment of the present invention has been described above in detail, it is understood that variations and modifications will be apparent to those who skilled in the art without departing from the scope and spirit of the invention.

For example, the preferred embodiments assume that the lid portion 13 is preferably made of the magnetic material, the present invention is not limited thereto. In order to minimize the effect of the electromagnetic wave generated at the armature 21 on the sensor 6, the lid portion 13 may be made of a material having an electrical conductivity with no magnetic characteristic (e.g., aluminum, copper, or the like). By virtue of such configuration in which no extra layer of an electromagnetic shield is required, the motor 1 is allowed to be small in the axial direction.

Figure 10:
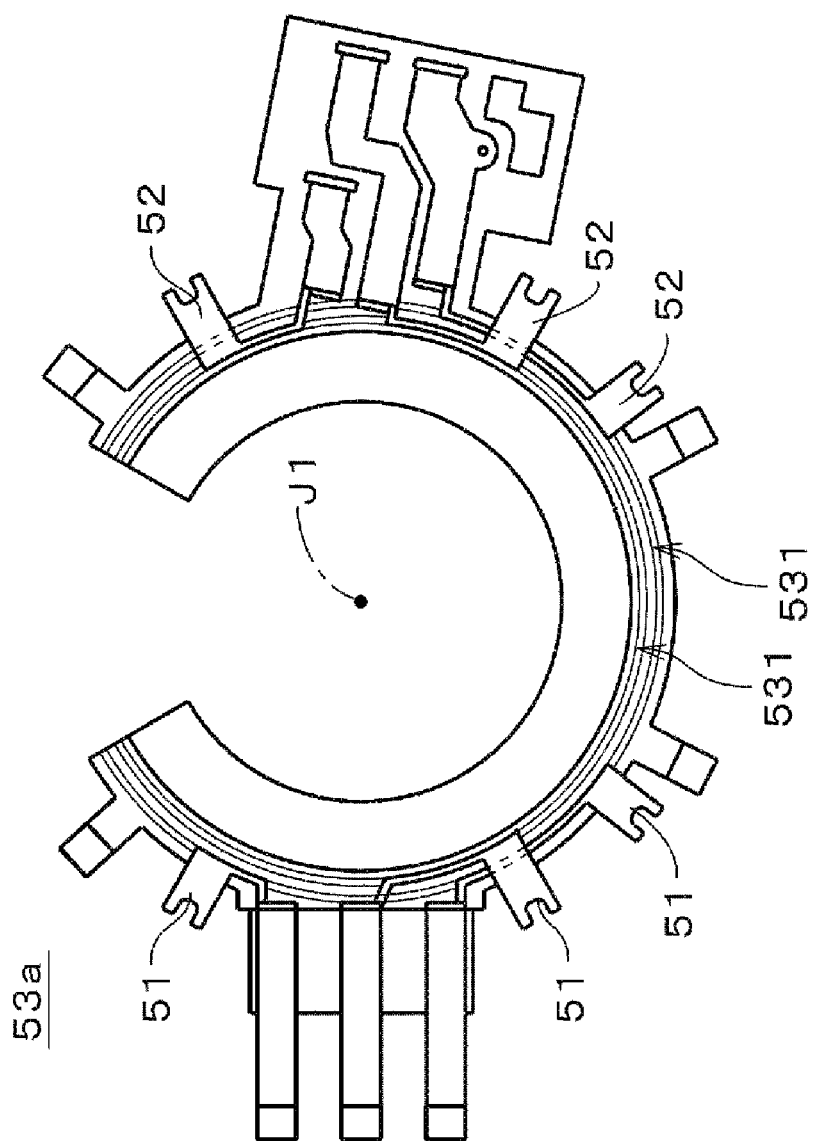
FIG. 10 is a schematic plan view of a busbar unit of another embodiment.

Although the preferred embodiments assume that the busbar holder 53 has an annular shape, the present invention is not limited thereto. The busbar holder 53 (hereafter, referred to as "busbar holder 53a") may include a substantially arc shape centered about the central axis J1 as shown in FIG. 10. In the busbar holder 53a, the groove portion 531 in which the first busbar 51 and the second busbar 52 are accommodated has a substantially arc shape centered about the central axis J1. Also note that in the busbar unit 5, the first busbars 51 and the second busbars 52 are preferably integrally formed by an insert molding along with the busbar holder 53a.

The armature 21 may include a plurality of coils 213 formed by winding a wire in a distributed manner around the corresponding teeth 2112 of the stator core 211. Also note that although the preferred embodiments described above assume that the stator core 211 includes the segment cores, the present invention is not limited thereto. Also note that the armature 21 may have a substantially rectangular shape.

Although the preferred embodiments described above assume that the yoke 61 and the sensor magnet 62 are arranged substantially perpendicular to the central axis J1, the present invention is not limited thereto. The sensor magnet 62 and the yoke 6 may have a substantially cylindrical shape and may be arranged substantially in parallel with the central axis J1. In such a case, the Hall element is arranged at a radially outer side of the sensor magnet and opposite thereto.

Although the preferred embodiments described above assume that the sensor 6 includes the sensor magnet 62 and the Hall element, the present invention is not limited thereto. For example, a resolver of a variable reluctance type may be used as a sensor. It is to be appreciated that since the sensor 6 includes the sensor magnet 62 and the Hall element, the sensor 6 is allowed to be small in the axial direction thereby reducing the dimensions of the motor.

Also note that the although the preferred embodiments described above assume that the motor according to the present invention is used to generate torque for the power steering unit, the present invention is not limited thereto.

What is claimed is:

1. A motor comprising:
a stator portion including an armature;
a rotor portion including a shaft concentric with a central axis, a rotor core having a substantially cylindrical shape arranged to surround the shaft, and a field magnet which is arranged at the rotor core and which, along with the armature, generates a torque centered about the central axis;
a first bearing portion and a second bearing portion arranged at a corresponding axial side of the rotor core to rotatably support the shaft;
a sensor, including a sensor magnet having a substantially annular plate shape and a first Hall element, arranged at an axial side of the armature to magnetically detect an angular position of the rotor core with respect to the stator portion;
a housing arranged to accommodate therein the stator portion and the rotor portion; and
a busbar unit arranged at an axial end of the armature to connect the armature to an external power source; wherein
the busbar unit includes a busbar holder having a substantially annular shape or arc shape and made of an insulating material centered about the central axis;
the housing includes:
a housing body having an opening at an axial side thereof; and
a lid portion arranged between the armature and the sensor to retain the first bearing portion and to close the opening of the housing body;
the lid portion includes a first concave portion and a second concave portion arranged on an upper surface of the lid portion;
the first concave portion is arranged to accommodate the sensor magnet and the first Hall element therein;
the sensor magnet is affixed to the shaft such that the sensor magnet is arranged substantially perpendicular to the central axis to overlap the busbar holder in a radial direction;
the first Hall element is arranged to oppose a magnetized surface of the sensor magnet;
the second concave portion is arranged to accommodate the first bearing portion; and
the first concave portion and the second concave portion are arranged substantially inward of the busbar holder in the radial direction such that a circumferential surface the busbar holder is arranged to oppose the first concave portion and the second concave portion.

2. The motor according to claim 1, wherein the lid portion is made of a magnetic material.

3. The motor according to claim 1, wherein the lid portion is made of pressed material.

4. The motor according to claim 1, wherein the sensor further includes a second Hall element arranged opposite to the magnetized surface of the sensor magnet and arranged further from the central axis than the first Hall element, and at the magnetized surface of the sensor magnet, a number of magnetic poles of a first domain having a substantially annular shape corresponding to the first Hall element is different from a number of magnetic poles of a second domain having a substantially annular shape corresponding to the second Hall element.

5. The motor according to claim 1, wherein the motor is arranged to assist operating a vehicle.

6. A vehicle comprising the motor according to claim 1.

* * * * *